United States Patent [19]

Gonser

[11] 4,422,891
[45] Dec. 27, 1983

[54] VITRIFIABLE ADHESIVE PROCESS

[75] Inventor: Donald I. Gonser, York, Pa.

[73] Assignee: Dentsply Research & Development Corporation, Milford, Del.

[21] Appl. No.: 274,065

[22] Filed: Jun. 16, 1981

[51] Int. Cl.³ .................. B32B 31/26; C04B 37/00; C04B 39/00
[52] U.S. Cl. ..................... 156/89; 156/329; 427/53.1; 427/54.1; 427/160; 428/447
[58] Field of Search ............. 156/89, 329; 427/54.1, 427/160, 163, 53.1; 428/447; 204/159.13, 159.22; 528/12, 21, 24; 526/229

[56] References Cited

U.S. PATENT DOCUMENTS

| 3,398,210 | 8/1968 | Plueddemann et al. | 260/827 |
| 3,619,246 | 11/1971 | Bragole | 427/54.1 |
| 3,728,185 | 4/1973 | Gray | 156/89 |
| 3,901,752 | 8/1975 | Taylor | 156/155 |
| 3,919,438 | 11/1975 | Urkevich | 427/54.1 |
| 4,073,967 | 2/1978 | Sandvig | 427/54.1 |
| 4,082,635 | 4/1978 | Fritz et al. | 428/447 |
| 4,188,451 | 2/1980 | Humphrey | 427/54.1 |
| 4,201,808 | 5/1980 | Cully et al. | 427/54.1 |
| 4,269,753 | 5/1981 | Mine et al. | 260/33.4 SB |

Primary Examiner—Caleb Weston
Attorney, Agent, or Firm—Woodcock, Washburn, Kurtz, Mackiewics & Norris

[57] ABSTRACT

Processes are provided for the adhering together of articles employing vitrifiable adhesives. According to a preferred embodiment, two or more articles are contacted with a polymerizable adhesive comprising a particulate, inorganic filler and a polymerizable resin comprising at least 0.25% by weight of the adhesive of a polymerizable silane. The adhesive is then polymerized and the polymerized adhesive heated to afford a vitrified bond.

29 Claims, 2 Drawing Figures

VITRIFIABLE ADHESIVE PROCESS

BACKGROUND OF THE INVENTION

1. Field of the Invention

This invention relates to processes for adhering articles together. More particularly, such processes are disclosed wherein articles are fused together employing vitrifiable adhesive compositions. Processes wherein fixturing of articles is accomplished prior to vitrication are also disclosed.

2. Description of the Prior Art

It has long been desired to provide processes for the adhering together of objects employing resinous adhesives which are suited to exposure to high temperatures. Such high temperature stable adhesives, however, are rare. At present, only a limited number of adhesives such as zinc and other metal phosphates and certain epoxy and phenolic resins are well adapted for resistance to thermal degradation; the upper temperature operating limits for these compositions is relatively modest. Accordingly, when adhesives or bonding agents are desired which are stable to high operating temperatures, such as, for example, in excess of about 300° C., use of sauerreisen cements and similar inorganic filling materials has been resorted to.

As is well known to those skilled in the art, the sauerreisens are aqueous based, inorganic materials which may be used to bond together articles. Accordingly, such sauerreisens are applied to the articles to be bonded together and the material exposed to high temperature, usually through firing. The sauerreisens are thus caused to fuse to afford bonding between or among the articles. The sauerreisens and similar cements may be used only according to processes which are difficult to practice and which result in bonded species which are lacking in certain desired physical or electrical characteristics. Thus, sauerreisen-bonded articles have significant water-sorptivity. In this regard, such processes provide bonds which tend to be partially conductive of electricity when employed under conditions of high humidity and are, accordingly, unsuitable for certain electrical applications. For example, the Federal Aeronautics Administration requires that cements used in the construction of lamp units for runway illumination at airports in the United States have a value of 5,000 Megohms when tested under the Megger insulation test procedure. See in this regard, Megger ® Manual, James G. Biddle Co. Philadelphia, Pa. (1954). At present, no known adhesive composition, resinous or otherwise, passes the F.A.A. Megger test while retaining good physical properties at the elevated temperatures experienced by runway lamps. Those skilled in the art will readily appreciate that numerous other uses exist for processes which provide high temperature stable adhesives and bonding agents which have good electrical insulative values under conditions of high humidity.

U.S. Pat. No. 3,901,752 issued to Taylor discloses the employment of mixtures of pyrolizable polymeric binders and polymerizable organic compositions for the in situ preparation or adhesive compositions at high temperatures. Such mixtures are especially suitable for laminations.

U.S. Pat. No. 3,728,185 issued to Gray discloses compositions having inorganic particulates dispersed in a binder comprising an olefin-SO₂ copolymer. Upon heating, $SO_2$ and olefin are liberated and the inorganic material fused to effect sealing.

OBJECTS OF THE INVENTION

It is an object of this invention to provide processes for adhering two or more objects together.

It is yet another object to provide such adhesive processes which employ vitrifiable adhesives.

Yet another object is to obtain vitrified adhesives from such processes which are at once stable to high temperatures and retain good electrical insulative properties under conditions of high humidity.

Yet another object is to provide such adhesive processes which enable fixturing of one article to another prior to adhesion.

Another object is to secure such adhesive processes which employ photochemical polymerization to establish the position of one article relative to a second article so that vitrification of the adhesive will be accompanied by retention of the preselected spatial orientation of the articles.

Yet another object is directed to processes which provide vitrified adhesives which are hydrophobic.

These and other objects are obtained through the employment of one or more embodiments of the present invention.

SUMMARY OF THE INVENTION

Figure 1:
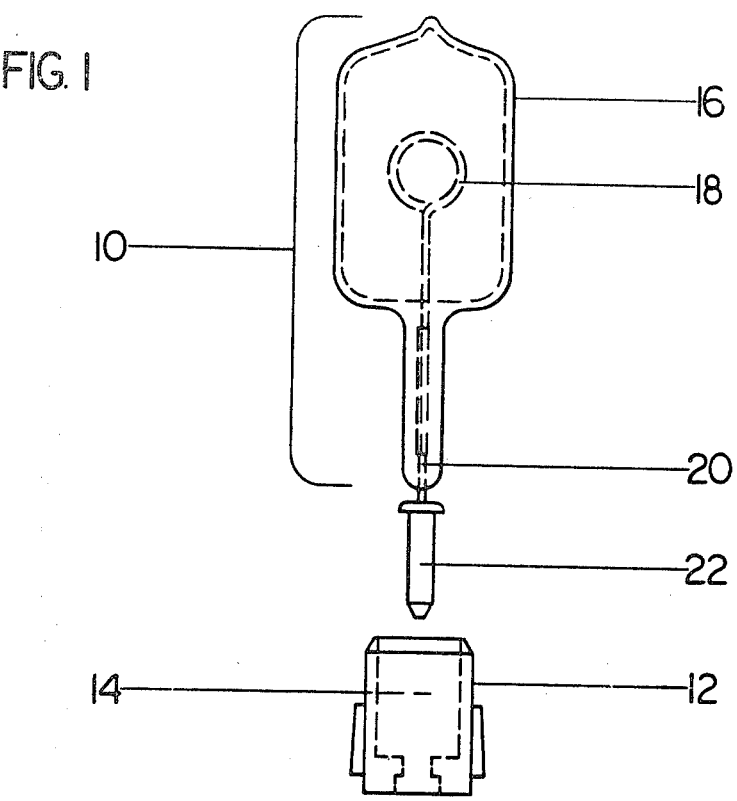
FIG. 1 is an exploded view of an incandescent lamp such as is used in projection and other devices. This figure is intended to represent schematically the family of lamp-type devices including those which are used at high temperatures and those which must withstand high humidities without electrical breakdown. This group includes in particular lamps suitable for use in airport runway lighting and other outdoor uses.

It has been found that certain filled, polymerizable silane-containing adhesives may be vitrified at elevated temperatures to form structurally stable, cohesive, high temperature stable, adhesive bonding structures. Additionally, it has been found that processes employing such polymerizable silane-containing adhesives may result in hydrophobic, electrically insulative structures. More particularly, it has been found that processes employing such silaneous adhesives comprising at least about 25% of an inorganic particulate filler and a polymerizable resin comprising at least about 0.25% by weight of the adhesive of a polymerizable silane may be formulated to cause vitrification of the adhesive and formation of a beneficial adhesive bonding structure upon heating. Accordingly, it has been discovered that two or more objects may be adhered together by contacting each of the articles with a polymerizable adhesive comprising at least about 25% of an inorganic particulate filler and a polymerizable resin comprising at least about 0.25% by weight of the adhesive of a polymerizable silane, by polymerizing the adhesive and by heating the polymerized adhesive to effect vitrification. According to a preferred embodiment, the polymerization of the vitrifiable adhesive is accomplished through the use of actinic light-initiated reactions. It has also been found possible to effect fixturing of the articles to be adhered together prior to the polymerization of the adhesive and subsequent vitrification. In this way, precise alignment of articles relative to each other may be accomplished which will result in precise spatial orientation of the articles in the resulting vitrified assembly. It has also been discovered to formulate articles wherein two or more subunits have been adhered together employing the vitrified adhesives according to the processes of the present invention.

DETAILED DESCRIPTION OF THE INVENTION

It has been found that adhesives comprising at least about 25% of an inorganic particulate filler and a polymerizable resin comprising at least about 0.25% by weight of the adhesive of a polymerizable silane undergo vitrification upon exposure to elevated temperatures. Accordingly, it has been observed that when such adhesives have been employed as fixturing adhesives in high temperature projection lamps, and when such lamps are operated at elevated temperatures, for example above about 300° C., that volatilization of certain organic compounds occurs. Initially, this volatilization was considered to be a defect of the system and was viewed as being an indication that such adhesives would not be useful at elevated temperatures. It was subsequently found, however, that the volatilization of the organic constituents of the adhesive occurred simultaneously with the vitrification of the residual portions of the adhesive. More particularly, it was observed that when the resinous component of the filled adhesive comprised a polymerizable silane in an amount of at least about 0.25% of the total weight of the adhesive, upon exposure of the polymerized adhesive to elevated temperatures, a transformation occurred in the adhesive which is described for the purposes of this specification as being a vitrification. It was observed that following such high temperature processing, the adhesive residue adhered to the articles to which it was contacted, was hard and durable, was hydrophobic, and did not degrade upon further exposure to high temperatures.

While the mechanism of vitrification in the present system is not fully understood, it is believed that the presence of at least about 0.25% by weight of the adhesive of polymerizable silane in the resinous component of the adhesives useful in the practice of the present invention causes an interlocking of the particulate filler used in the adhesive. The resulting structure may be viewed as being a heterogeneous silicate aggregate. Due to the natural hydrophobicity of silicates, the aggregate tends to reject water absorption and to maintain a natural electrical resistivity. This material is viewed as being not unrelated to a ceramic comprising as it does a large proportion of silicates. It is similarly resistant to further changes upon exposure to high temperatures and is believed to be virtually unchanged up to at least about 1,000° C.

The polymerizable adhesives useful in the practice of the processes of this invention comprise at least about 25% of an inorganic particulate filler and a polymerizable resin comprising at least about 0.25% by weight of the adhesive of a polymerizable silane.

The inorganic particulate fillers useful in the practice of this invention may be any of a wide range of fillers known to those skilled in the art. Accordingly, silicates such as quartz, silica, pyrogenic silica, fumed silica, barium silicate, and numerous others may be so employed. Such silicates are preferred for the practice of the present invention but other fillers such as alumina, lanthana, baria, and other fillers known to those skilled in the art may also be employed. All such fillers should be employed in particulate form. While numerous particle size ranges may be employed, it is preferred to have relatively small particle size distributions. Accordingly, fillers such as microfine vitrious silica and pyrogenic silica are preferred.

The fillers are included in the adhesives useful in the practice and processes of this invention in an amount of at least about 25% by weight. Accordingly, amounts of filler from about 25% to about 90% may be so employed. Preferably, amounts of filler of from about 35% to about 80% and even more preferred from about 50% to about 80% are used. Mixtures of fillers may be employed.

The fillers may be silanated prior to use if desired. The silanes employed in such treatments are not considered when calculating the amount of polymerizable silane included in the adhesive.

The adhesives useful in the practice of the processes of this invention also comprise a polymerizable resin. The polymerizable resins useful in this regard, may be any of a wide variety of resins which may be polymerized photochemically, thermally, or otherwise to yield polymerized products. Photochemically reactive silanes are preferred. It is necessary only that the polymerizable resin component of the adhesive comprise at least about 0.25% by weight of the adhesive of a polymerizable silane. The polymerizable resins which are preferred for employment in the polymerizable adhesives of the present invention are disclosed in copending U.S. patent application Ser. No. 233,951 filed Feb. 17, 1981 and assigned to the assignee of this invention. The specification of the foregoing application is incorporated by reference as though set forth fully herein.

Accordingly, the silanes which are preferred for use in the practice of this invention are any of those silanes which contain functionalities which participate in photochemical on other polymerization. In general, such silanes have one or more reactive ethylenic unsaturations. Such unsaturations include, for example, vinyl, allyl, "dienyl", acetylenyl, acrylyl, methacrylyl, other acrylic homologs, and many other reactive ethylenic functionalities. Preferably, such silanes belong to the class of acrylosilanes, which class includes methacrylic and homologous species. Such families may be represented by the formula:

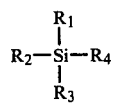

I.

where $R_1$–$R_4$ are the same or different and may be H, alkyl, alkenyl, aryl, aralkyl, alkaryl, alkoxy, vinyl, aryloxy, acyloxy, etc. having from 1 to about 30 carbon atoms and where at least one of $R_1$–$R_4$ is alkyl, aryl, aralkyl, alkaryl having from 1 to about 30 carbon atoms and being substituted with at least one group having formula II:

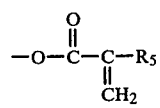

II.

where $R_5$ is H, alkyl, alkenyl or phenyl having from 1 to about 6 carbon atoms. Of these acrylosilanes, preferred species include those where $R_1$–$R_3$ are the same or different and may be methoxy, ethoxy, propoxy, etc., methoxyethoxy, butoxyethoxy, etc., methyl, ethyl, propyl, etc., and where $R_4$ may be acryloxyethyl, acryloxypropyl, methacryloxypropyl, methacryloxybutyl, etc. Those skilled in the art will appreciate that pluralities of such acrylic substituents may be appended to $R_4$ and that others of the substituents on silicon, i.e. $R_1$–$R_3$, may also be so substituted. Species such as 3-methacryloxypropyltrimethoxysilane and methacryloxypropyltris(methoxyethoxy)silane have been found to be most preferred for use in certain embodiments of this invention.

Another family of silane species which is useful in the practice of this invention include those light polymerizable silanes which have non-acrylic photochemically reactive ethylenic unsaturations. Accordingly, such family may be represented by formula I:

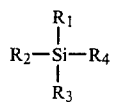   I.

where $R_1$–$R_4$ have the meanings suscribed to them previously and at least one of $R_1$–$R_4$ has the formula:

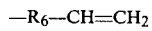   III.

where $R_6$ is alkyl, aryl, aralkyl, or alkaryl having from 1 to about 30 carbon atoms. While formula III discloses a terminal ethylenic unsaturation, those skilled in the art will easily recognize that compounds having internal ethylenic unsaturations may also be suitable for the practice of one or more embodiments of the present invention. This family will be recognized to include vinyl, allyl, and other ethylenically unsaturated silanes. It should be appreciated that others of groups $R_1$–$R_3$ may also include one or more of such reactive ethylenic unsaturations.

Exemplary members of this family of polymerizable silanes which is useful for the practice of the invention include, for example, allyldimethylsilane, allyltriethoxysilane, allyltrimethylsilane, diphenylvinylethoxysilane, divinyldiethoxysilane, phenylmethylvinylsilane, tetraallyloxysilane, tetravinylsilane, trimethylsilylacetylene, 1-(trimethylsilyl)propane, trivinylethoxysilane, trivinylmethylsilane, vinyldimethylethoxysilane, vinylmethyldiacetoxysilane, vinylmethyl-diethoxysilane, vinyloxytrimethylsilane, vinyltriacetoxysilane, vinyltriethoxysilane, vinyltriisopropoxysilane, vinyltrimethoxysilane, vinyltrimethylsilane, vinyltriphenoxysilane, vinyltris(2-methoxyethoxy)silane, and related species.

Those skilled in the art will recognize that the above descriptions of silaneous materials suitable for use in the practice of one or more embodiments of this invention is, of necessity, limited. Those skilled in the art will understand that numerous ethylenically unsaturated silane compounds exist which are photochemically or otherwise polymerizable. Such persons will easily be able to ascertain which of such compounds are suitable for inclusion in one or more embodiments of the invention. Accordingly, all such compounds may, prima facie, be used therein. Furthermore, mixtures of two or more of such silane compounds may be so employed.

Since most silane compositions available commercially have been treated with one or more inhibitors to suppress autopolymerization during storage, and since such inhibitors have been found to retard or prevent rapid photopolymerization, it may be necessary to remove most or all of such inhibitors from silane species for use in the practice of this invention when photochemical polymerization is desired.

As has been indicated, the polymerizable silane (or mixtures of silanes) may be included in the polymerizable resins of the present invention in amounts of at least about 0.25% by weight of the polymerizable adhesive. Amounts of polymerizable silane may be included up to about 75% of the total weight of the polymerizable adhesive, however. It is preferred, however, to employ amounts of silane in the polymerizable resin between about 1% and about 60% of the weight of the polymerizable adhesive, and even more preferred to employ from about 5% to about 50% of such silane.

The polymerizable resin component of the polymerizable adhesive may also comprise other polymerizable species in addition to the polymerizable silanes. Accordingly, the polymerizable resins may comprise ethylenically unsaturated or otherwise polymerizable constituents up to about 74.75% by weight of the polymerizable adhesive.

Preferred reactive, ethylenically unsaturated materials for the practice of this invention include the acrylic, methacrylic, ethacrylic, etc. esters of various alcohols and other hydroxyl containing polymers and prepolymers. Also useful are vinyl, allyl, styryl, "enyl", "dienyl", acetylenyl, and numerous other reactive, ethylenically unsaturated species. Preferred for use for the practice of the invention are the acrylic and lower alkyl acrylic acid esters, such as the acrylates and methacrylates. Exemplary species of this class include the acrylic, methacrylic, etc. esters of materials having from 1 to about 40 and preferably from 1 to about 30 carbon atoms. Such materials may be substituted with, inter alia, hydroxyl, amino, thiol, halogen, and other functionalities. Especially preferred examples include the esters of methyl-, ethyl-, isopropyl-, perfluorooctyl-, hydroxyethyl, 4-hydroxyphenyl-, aminoethyl-, aminophenyl-, thiophenyl-, and numerous other alcohols. Preferred among these are the acrylic, methacrylic, etc. esters of bisphenol-A and its epoxy resins, prepolymers and related materials. The acrylic esters of 2,2-bis(4-hydroxy2,3,5,6tetrafluorophenyl)propane are also preferred. Those skilled in the art will recognize that numerous other species are also suitable. Polymerizable, ethylenically unsaturated materials having two or more reactive functionalities may also be included. Thus, di-, tri-, and other polyfunctional, ethylenically reactive species may be employed.

In addition to the inorganic, particulate filler and polymerizable resin components, the polymerizable adhesive may comprise additional substituents as well. Accordingly, it is usually and preferably desirable to include one or more activating agents to facilitate the polymerization of the adhesive. Such activating agents may be of the type which catalyze thermopolymerization. Alternatively, a photosensitizing system may be so employed. For thermopolymerization, any of a number of thermal, radical-initiating catalysts which are well known to those skilled in the art may be employed. Included among these are benzoyl peroxide, di-tert-butyl peroxide, di-cumyl peroxide, and many others. These may preferably be included in amounts of from about 0.1% to about 2% by weight of the polymerizable adhesive. When such thermal initiation catalysts are present, polymerization of the polymerizable adhesive may be obtained by exposure thereof to heat or other thermal energy source such as microwave radiation.

According to a preferred practice of the inventive processes, a photochemical initiating system is included in the polymerizable adhesives. Accordingly, such adhesives comprise an amount of a photosensitizing system effective to cause polymerization of the adhesive when it is exposed to actinic light. The photosensitizing system may comprise any of those compounds which are capable of initiating such photopolymerization. Thus, the photosensitizing system may comprise sensitizing species for visible, ultraviolet, or other actinic light. For the practice of some embodiments of the invention, such photosensitizing system comprises an alpha diketone together with an amine. Such alpha diketones (also known as alpha-beta diketones) may be any of those alpha diketones capable of initiating photopolymerization in the polymerizable adhesive systems of this invention. Of these, camphoroquinone, benzil, biacetyl, 9,10-phenanthrenequinone, and 1,2-naphthoquinone have been found to be preferred. Most preferred is caphoroquinone. Numerous amines have been found to be useful when joined with alpha diketones in photosensitizing systems. Such amines as tributylamine, tripropylamine, etc. may be employed. Preferred species include the substituted amines such as N,N-dialkylalkanolamines, N-alkyldialkanolamines and trialkanolamines. N-methyldiethanolamine and N,N-dimethylethanolamine are most preferred. Such combinations of alpha diketones and amines to form photosensitizing systems will be recognized by those skilled in the art to be especially preferred for use in photopolymerizable adhesives which are to be polymerized by visible light.

The adhesives of this invention may also be polymerized by ultraviolet light. For such ultraviolet light polymerization, ultraviolet light sensitizing systems should be included. Those skilled in the art will recognize that numerous ultraviolet light sensitizing systems are known including numerous aromatic, ketonic and other families of compounds. One such family is represented by the formula:

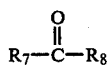

IV.

where $R_7$ and $R_8$ may be the same or different and may be alkyl or aryl. Other sensitizers include benzoin alkyl ethers, which are preferred. Thus, the methyl, ethyl, propyl, etc. benzoin ethers may be employed. Benzoin methyl, ethyl, and isopropyl ethers have been found to be preferred. Also preferred, are benzoin ketals such as benzoin dimethylketal and analogous species. These may also be considered to be benzoin alkyl ethers.

According to certain embodiments of this invention, the photosensitizing system may comprise mixtures of ultraviolet and visible light sensitizing systems. Thus, for example, an alpha diketone and amine may be combined with a benzoin ether to form a broad spectrum photosensitizing system. Light polymerizable adhesives employing such sensitizing systems will have concomitantly broad polymerization response to light. Such combined photosensitizing systems are preferred in certain embodiments. It is believed that when benzoin alkyl ethers are combined with the alpha dione and amine to form such broad spectrum sensitizing systems in the adhesive formulations of the invention, the benzoin alkyl ethers are stabilized such that storage of the resulting polymerizable adhesives is facilitated. Accordingly, it is believed that it is possible to employ lesser quantities of benzoin alkyl ethers when such ethers are admixed with alpha diketones and amines than is otherwise required.

According to another preferred embodiment of the present invention, the adhesive processes employ polymerizable adhesive compositions which comprise photosensitizing systems which are supplemented by the addition of thermal polymerization promoters. Such thermal promoters may be peroxides or other radical reaction promotion compounds such as benzoyl peroxide, which have been discussed above, in addition to metal species such as copper (II) acetoacetate, etc. Accordingly, amounts of peroxide or other species which are effective to promote the polymerization of the polymerizable adhesives according to the processes of the present invention may be included in such adhesives. Such promoters may be added in an amount effective to increase substantially the rate of the photopolymerization reaction. In general, such promoters may be added in an amount of from about 0.1% to about 2% of the weight of the polymerizable resin.

The photosensitizing systems are present in the polymerizable adhesives of this invention in amounts effective to cause polymerization of the adhesive when the adhesive is exposed to actinic light of suitable wavelength and intensity. In general, such photosensitizing systems comprise from about 0.3% to about 8% of the weight of the polymerizable resin. It is more preferred to employ such photosensitizing systems in amounts of from about 0.4% to about 6% of such total resin weight. Accordingly, in a typical polymerizable adhesive composition, the polymerizable resin comprises approximately 40% by weight of the total adhesive weight while the photosensitizing system comprises approximately 2% by weight of the total weight of the polymerizable adhesive. The individual constituents of the photopolymerization system may vary. Thus, camphoroquinone may be employed in the photosensitizing systems in amounts from about 0.1% to about 2% by weight of the total resin with from about 0.2% to about 1% being preferred. Accompanying the camphoroquinone may be an amine such as methyldiethanolamine. Such methyldiethanolamine may be added in amounts of from about 0.3% to about 6% by weight of the total weight of the polymerizable resin with from about 0.5% to about 3% being preferred. It has been found to be beneficial to admix, for example, benzoyl peroxide in such photosensitizing systems in amounts varying from about 0.1% to about 2% by weight of the total weight of the polymerizable resin. When ultraviolet light sensitizing systems are employed, such as benzoin ethers, they may, similarly, comprise from about 0.1% to about 6% by weight of the total weight of the polymerizable resin, with from about 0.3% to about 3% by weight being preferred. It should be appreciated that complex photosensitizing systems such as those which comprise in combination, alpha-diketones, amines, benzoin ethers, and peroxides may be formulated and that, in some embodiments, such complex, broad spectrum systems are preferred. Again, it should be appreciated that the best measure of the appropriate amount of components of a photosensitizing system according to the present invention is that amount which is effective in causing polymerization of the adhesive when such adhesive is exposed to actinic light. The polymerizable adhesives may also comprise organic fillers, pigments, colors, dyes, surface active agents, opacifiers, radio-opaqueing agents, and other modificants.

In general, the adhesives for use in the processes of this invention may be formulated by mixing together the selected components. Accordingly, it is generally necessary only to mix the silaneous species together with the non-silaneous polymerizable compounds (if any) to form the polymerizable resin and to add thereto the selected photosensitizing system. The inorganic fillers along with the optional organic fillers, pigments, and other modificants are then combined with the resin. Thereafter, it is usually helpful to degas the formulation and/or to allow the formulation to stand for from about 6 hours to about 7 days to allow full homogenization and dispersion of the components of the mixture. Although certain of the adhesives are light curable, preparation and storage away from incidental light is usually not necessary due to their remarkable stability to low ambient light levels.

Figure 2:
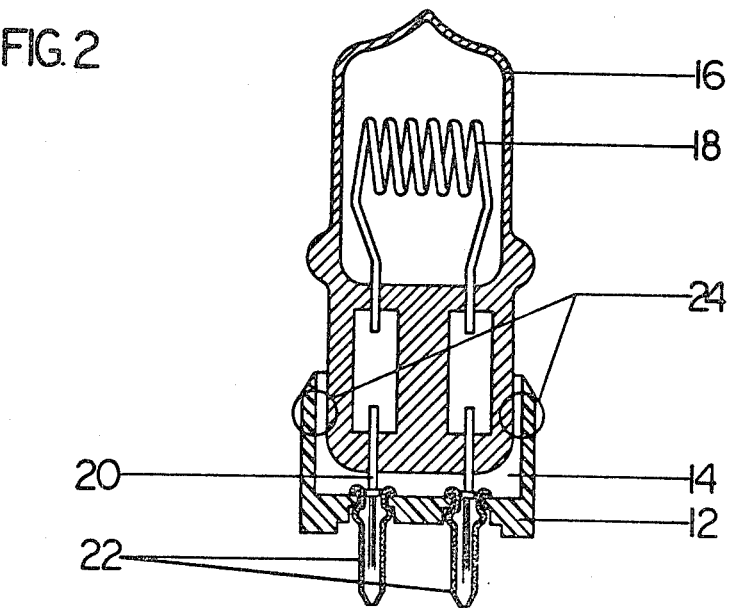
FIG. 2 shows the lamp of FIG. 1 with a quantity of adhesive in place.

According to the processes of the present invention, two or more articles are adhered together by contacting each of the articles with the polymerizable adhesive compositions. The adhesives are then polymerized and subsequently vitrified by exposure to heat. It will be appreciated that two or more articles may be adhered together according to the present processes. One group of articles, the construction of which is particularly benefited by the use of the present processes, is incandescent and other lamp devices. FIG. 1 is a schematic exploded view of such an incandescent lamp. Thus, the lamp may be viewed as comprising an envelope bulb unit 10 and a base assembly 12 having a cavity 14 for the insertion of the bulb. FIG. 2 shows a different view of the lamp of FIG. 1 after the bulb and base subassemblies have been conjoined. Thus, the bulb comprises a glass envelope 16, a filament 18, leads 20 and contact pins 22.

According to the present invention, polymerizable adhesive 24 is employed to fill at least a portion of cavity 14 which is not occupied by bulb subassembly 10. The polymerizable adhesive is subsequently polymerized and then heated to effect vitrification thus to result in a fully cemented lamp. Following vitrification by heating, the cement 24 is strong, strongly adheres the lamp to the base, is hydrophobic, and maintains good electrical resistivity at high humidity. It is also stable to temperatures of at least 750° C.

It is frequently desirable to effect a precise optical alignment between the filament 18 via the bulb 16 and the base 12. This goal may be obtained according to the present invention by employing a fixturing process. In such a case, a photopolymerization initiator is included in the polymerizable adhesives used in the practice of the present processes. In this regard, the fixturing process is preferably practiced in accordance with Ser. No. 234,473 filed Feb. 17, 1981 and assigned to the assignee of this invention, which application is included by reference as if fully set forth herein.

Accordingly, when such fixturing is desired in conjunction with the practice of the present processes, portions of an actinic light polymerizable adhesive 24 is placed in contact with both the bulb and the base 12. Subsequent positioning of the base and the bulb relative to each other is performed to attain a preselected spatial orientation thereof. Irradiation of the polymerizable adhesive with actinic light for a period of time sufficient to cause polymerization of the adhesive results in the fixed maintenance of the spacial orientation. In such cases, it is not necessary completely to fill the cavity 14 with polymerizable adhesive 24 prior to fixturing. It is possible to use only discrete amounts of adhesive during this fixturing phase. Following the polymerization of the polymerizable adhesive with actinic light, the material may be vitrified. Optionally, additional quantities of polymerizable adhesive may be added to the cavity 14, polymerized, and the entire mass vitrified either seriatim or at once.

According to a preferred embodiment one or more of the articles to be joined together is treated by a silanating agent. Such treatment promotes the intimate adhesion of the cement to the article before and after vitrification. Any of those silanating agents known to those skilled in the art may be used such as aminopropyltriethoxysilane, methyltrichlorosilane, etc.

It should be appreciated that the fixturing process thus disclosed is not limited to the assembly of lamps but is applicable to a wide range of fixturing and manufacturing processes. After two or more articles have been contacted with the polymerizable adhesive according to the processes of the present invention and after such adhesive has been polymerized either photochemically, thermally or otherwise, the polymerized adhesive is vitrified. This vitrification accomplished through the application of heat or thermal energy to the polymerized adhesive. Accordingly, the adhesive is heated either in an oven, with a flame, through microwave radiation, or in other ways known to those skilled in the art at temperatures sufficient to drive off or vaporize volatile organic components and to cause vitrification of the polymerized adhesive. In those cases where articles are fabricated which are capable of generating internal heat, such as lamp assemblies, the heat source may emanate from the articles themselves. Accordingly, the lamp of FIGS. 1 and 2 may simply be operated in the normal fashion following polymerization of the adhesive. The internal heat generated by the incandescent lamp is sufficient in most cases to effect evolution of gaseous organic products, where present, and to vitrify the adhesive. This procedure is preferred in, for example, airport runway illumination devices. The heating to effect vitrification takes place at temperatures and for periods of time sufficient to cause substantially complete evolution of organic gases, if any. Additionally, temperatures and times are selected which are sufficient for the vitrification to proceed substantially to completion. In this regard, successful vitrification is evidenced by the cessation of evolution of organic gases, and the transformation of the adhesive into a substantially solid, strong, and unitary (albeit heterogeneous) body or mass. In general, exposure of the polymerized adhesives to temperatures in excess of about 300° C. for a period of about 1 hour or more will usually result in substantially complete vitrification of thicknesses of adhesive up to about 5 mm.

EXAMPLE 1

A polymerizable resin was formulated from the following constituents:

| | |
|---|---|
| methacryloxypropyltrimethoxysilane (electronic grade) | 113 g |
| Epocryl TM 370 acrylic species (Shell Co.) | 80 g |
| camphoroquinone | 1 g |
| N—methyldiethanolamine | 2 g |
| vinyltris(methoxyethoxy)silane | 3.8 g |
| benzoyl peroxide | 0.2 g |

| | |
|---|---|
| copper II ethylacetoacetate | 1 g |
| Dow-Corning 193 silicone surfactant | 1 g |
| Irgacure TM 651 (benzoin dimethylketal) | 1 g |
| | 203.0 g |

10 grams of this polymerizable composition were mixed with 0.8 grams of pyrogenic silica (Aerosil TM 972) and 40 grams of microfine vitreous silica to form a polymerizable adhesive. This adhesive could be polymerized to a depth of approximately 4.3 mm after exposure to visible light from a Caulk PRISMALITE TM unit. After a 20 second exposure to a 1.0 watt/cm$^2$ (400-500 mm) at contact visible light source, polymerization to approximately 5.5 mm was evidenced.

EXAMPLE 2

The polymerizable adhesive of Example 1 was used for the joining of a lamp bulb to its supporting sleeve. Thus, the lamp bulb and sleeve were contacted by a quantity of the polymerizable adhesive and caused to polymerize by exposure for about 10 seconds with a 1.8 watt/cm$^2$ (400-500 mm) at contact visible light source. Baking of the lamp for approximately 2 hours at 300° C. resulted in a vitrified adhesive layer firmly bonded to both lamp and sleeve. The adhesive was relatively impervious to water and evidenced no breakdown of resistivity upon exposure to humid conditions.

EXAMPLE 3

A polymerizable resin was formulated from the following constituents:

| | |
|---|---|
| methacryloxypropyltrimethoxysilane (electronic grade) | 57.07 g |
| Epocryl TM 370 acrylic species (Shell Co.) | 40.40 g |
| camphoroquinone | .51 g |
| N—methyldiethanolamine | 1.01 g |
| Dow-Corning 193 silicone surfactant | .50 g |
| Irgacure TM 651 (benzoin dimethylketal) | .51 g |
| | 100.00 g |

25.17 grams of this polymerizable compositions were mixed with 3.56 grams of pyrogenic silica (Aerosil TM 972) and 71.27 grams of finely ground quartz to form a polymerizable adhesive. This adhesive could be polymerized by exposure to visible light from a unit having an incidence of 1.8 watt/cm$^2$ at contact visible light source.

EXAMPLE 4

Adhesive compositions similar to that described in Example 3 were formulated having varying amounts of polymerizable silane. Accordingly such adhesives were formulated by replacing a portion or all of the silane with Epocryl TM acrylic to yield the composition of Table I. Two specimens of each of those adhesive composition were prepared in precision bore glass tubing, each having dimensions of 6 mm diameter by 12 mm length. Each specimen was polymerized by exposure to a common photoflood lamp for 2 minutes. The polymerized specimens were initially flamed with a bunsen burner to remove easily volatilized materials and then heated in a muffle furnace. The heating was begun at 400° C. for 30 minutes, raised to 500° C. for 15 minutes and then to 600° C. for 15 minutes. Total heating time was approximately one hour. Following this heating, all specimens were off white in color. The ends of specimens were made parallel, if necessary, with 600 grit silicon carbide paper and the crush force ascertained with an INSTRON testing machine. The results are recorded in Table I. The specimens having 0% silane were frangible; one fractured during handling. The remaining specimens exhibited physical cohesiveness and improved strength.

TABLE I

| silane as % of total weight | Average Compressive Strength, PSI |
|---|---|
| 0 | 20 |
| 0.25 | 83 |
| 1.25 | 94 |
| 2.50 | 166 |
| 5.0 | 462 |
| 14.25 | 938 |

What is claimed is:

1. A method of adhering a first article to a second article comprising:
    contacting each of said articles with a polymerizable adhesive comprising:
        at least about 25% by weight of said adhesive of an inorganic particulate filler, and
        a polymerizable resin comprising at least about 0.25% by weight of said adhesive of a polymerizable silane,
    polymerizing said adhesive to adhere said objects together, and
    heating said polymerizable adhesive at a temperature and for a time sufficient to drive off or vaporize volatile organic components of the polymerized adhesive to effect vitrification thereof.

2. The method of claim 1 wherein said heating is accomplished employing microwave radiation.

3. The method of claim 1 wherein said filler is present in major proportion of said adhesive and said silane is present in an amount of at least about 1% by weight of said adhesive.

4. The method of claim 1 wherein at least one of said articles has been treated with a silanating agent prior to said contacting step.

5. The method of claim 1 wherein said adhesive further comprises a visible light sensitizing system.

6. The method of claim 5 wherein said visible light sensitizing system comprises an alpha diketone and an amine in amounts sufficient to cause polymerization of said adhesive upon its exposure to visible light.

7. The method of claim 1 wherein said adhesive further comprises an ultraviolet light sensitizing system.

8. The method of claim 7 wherein said ultraviolet light sensitizing system comprises a benzoin alkyl ether in an amount sufficient to cause polymerization of said adhesive upon its exposure to ultraviolet light.

9. The method of claim 1 wherein said adhesive further comprises a visible light sensitizing system and an ultraviolet light sensitizing system.

10. The method of claim 5, 7, or 9 wherein said adhesive further comprises a polymerization promoter.

11. The method of claim 1 wherein said polymerization is attained photochemically.

12. The method of claim 1 wherein said polymerization is attained employing visible light.

13. The method of claim 1 wherein said heating is accomplished at temperatures of at least about 300° C.

14. The method of claim 1 wherein said polymerization is accomplished thermally.

15. The method of claim 14 wherein said polymerization and said heating to effect vitrification occur simultaneously.

16. A method of adhering a first article to a second article comprising:
  contacting each of said articles with a polymerizable adhesive comprising:
    at least about 25% by weight of said adhesive of an inorganic particulate filler, and
    a polymerizable resin comprising at least about 0.25% by weight of said adhesive of a polymerizable silane,
  positioning said objects relative to each other to attain a preselected spatial orientation,
  polymerizing said adhesive to adhere said objects together, and
  heating said polymerized adhesive at a temperature and for a time sufficient to drive off or vaporize volatile organic components of the polymerizable adhesive to effect vitrification thereof.

17. The method of claim 16, wherein said heating is accomplished employing microwave radiation.

18. The method of claim 16 wherein said articles are contacted with an additional quantity of said adhesive subsequent to said polymerizing step but prior to said heating step.

19. The method of claim 16 wherein said filler is present in major proportion by weight of said adhesive and said silane is present in an amount of at least about 1% by weight of said adhesive.

20. The method of claim 16 wherein at least one of said articles has been treated with a silanating agent prior to said contacting step.

21. The method of claim 16 wherein said adhesive further comprises a visible light sensitizing system.

22. The method of claim 21 wherein said visible light sensitizing system comprises an alpha diketone and an amine in amounts sufficient to cause polymerization of said adhesive upon its exposure to visible light.

23. The method of claim 16 wherein said adhesive further comprises an ultraviolet light sensitizing system.

24. The method of claim 23 wherein said ultraviolet light sensitizing system comprises a benzoin alkyl ether in an amount sufficient to cause polymerization of said adhesive upon its exposure to ultraviolet light.

25. The method of claim 16 wherein said adhesive further comprises a visible light sensitizing system and an ultraviolet light sensitizing system.

26. The method of claim 21, 23, or 25 wherein said adhesive further comprises a polymerization promoter.

27. The method of claim 16 wherein said polymerization is attained photochemically.

28. The method of claim 16 wherein said polymerization is attained employing visible light.

29. The method of claim 16 wherein said heating is accomplished at temperatures of at least about 300° C.

* * * * *